(12) United States Patent
Isola et al.

(10) Patent No.: US 9,906,527 B2
(45) Date of Patent: *Feb. 27, 2018

(54) DEVICE BLOCKING TOOL

(71) Applicant: BANK OF AMERICA CORPORATION, Charlotte, NC (US)

(72) Inventors: Rahul Isola, Charlotte, NC (US); Anthony P. Grossi, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/644,367

(22) Filed: Jul. 7, 2017

(65) Prior Publication Data

US 2017/0310669 A1    Oct. 26, 2017

Related U.S. Application Data

(63) Continuation of application No. 14/809,818, filed on Jul. 27, 2015, now Pat. No. 9,736,152.

(51) Int. Cl.
*H04L 29/06* (2006.01)
*G06F 21/57* (2013.01)
*H04L 29/12* (2006.01)

(52) U.S. Cl.
CPC ........ *H04L 63/0876* (2013.01); *G06F 21/577* (2013.01); *H04L 63/08* (2013.01);
(Continued)

(58) Field of Classification Search
CPC ... H04L 63/101; H04L 63/08; H04L 63/0876; H04L 63/1433; H04L 63/14; H04L 63/145; H04L 63/1458; G06F 21/55
See application file for complete search history.

(56) References Cited

U.S. PATENT DOCUMENTS

| 7,181,769 B1 | 2/2007 | Keanini et al. |
| 7,246,370 B2 | 7/2007 | Valente et al. |

(Continued)

OTHER PUBLICATIONS

H. Rahimi, T. Maimaiti and A. N. Zincir-Heywood, "A case study for a secure and robust geo-fencing and access control framework," 2014 IEEE Network Operations and Management Symposium (NOMS), Krakow, 2014, pp. 1-8.*

(Continued)

*Primary Examiner* — Kari Schmidt
(74) *Attorney, Agent, or Firm* — Michael A. Springs

(57) ABSTRACT

Automated locating and disconnection of undesired devices may include receiving a unique address of a candidate device, determining the address of the switch coupled to the candidate device based on the address of the candidate device, accessing the switch using the switch address, receiving switch information from the switch, receiving credentials from the user and commands to transform the candidate device into a disconnected state, and determining whether the user is permitted to execute the commands based on the credentials from the user. If it is determined that the user is permitted to execute the commands, the candidate device may be transformed into a disconnected state on the network and its address may be added to a blacklist. A device may be deemed to be undesired on the network due to intrusion events, violation of network policies, or other appropriate criteria.

20 Claims, 3 Drawing Sheets

(52) U.S. Cl.
CPC ............ *H04L 63/101* (2013.01); *H04L 63/14* (2013.01); *H04L 63/145* (2013.01); *H04L 63/1433* (2013.01); *H04L 63/1458* (2013.01); *H04L 61/103* (2013.01); *H04L 61/6022* (2013.01)

(56) References Cited

U.S. PATENT DOCUMENTS

| | | | |
|---|---|---|---|
| 7,516,487 | B1 | 4/2009 | Szeto et al. |
| 7,523,485 | B1 | 4/2009 | Kwan |
| 7,562,390 | B1 | 7/2009 | Kwan |
| 7,607,021 | B2 * | 10/2009 | Rayes .............. H04L 61/2015 713/188 |
| 7,735,114 | B2 | 6/2010 | Kwan et al. |
| 7,966,650 | B2 * | 6/2011 | Manring .............. H04L 63/102 709/229 |
| 8,146,137 | B2 * | 3/2012 | Manring .............. H04L 63/102 709/225 |
| 8,239,929 | B2 | 8/2012 | Kwan et al. |
| 8,447,865 | B2 | 5/2013 | Bansal et al. |
| 8,453,227 | B2 | 5/2013 | Aiello et al. |
| 8,533,227 | B2 | 9/2013 | Schneider |
| 8,862,735 | B1 | 10/2014 | Singh et al. |
| 8,938,782 | B2 | 1/2015 | Sawhney et al. |
| 8,949,827 | B2 | 2/2015 | Becker et al. |
| 8,984,504 | B2 | 3/2015 | Becker et al. |
| 9,323,627 | B1 | 4/2016 | Kulkarni et al. |
| 2001/0039623 | A1 | 11/2001 | Ishikawa |
| 2007/0220252 | A1 | 9/2007 | Sinko |
| 2008/0127338 | A1 | 5/2008 | Cho et al. |
| 2009/0007218 | A1 | 1/2009 | Hubbard |
| 2009/0023431 | A1 | 1/2009 | Sim et al. |
| 2009/0172156 | A1 | 7/2009 | Yadav et al. |
| 2014/0282905 | A1 | 9/2014 | Iyer et al. |
| 2016/0165449 | A1 | 6/2016 | Poisner |
| 2016/0234167 | A1 | 8/2016 | Engel et al. |

OTHER PUBLICATIONS

Sung, Yu-Wei Eric, et al. "Towards systematic design of enterprise networks." IEEE/ACM Transactions on Networking (TON) 19.3 (2011): 695-708.*

D. H. H Kang, B. K. Kim and J. C. Na, "Cyber threats and defence approaches in SCADA systems," 16th International Conference on Advanced Communication Technology, Pyeongchang, 2014, pp. 324-327.*

Argyroudis, P. G. et al., "Securing Routing for Mobile Ad Hoc Networks," IEEE Communications Surveys & Tutorials, vol. 7, No. 3, Third Quarter 2005, pp. 2-21.

Huang, Y. et al., "A Cooperative Intrusion Detection System for Ad Hoc Networks," Proceedings of the 1st ACM Workshop on Securityh of Ad Hoc and Sensor Networks, 2003, pp. 135-147.

Bajwa, S. S. et al., "Grouped Black Hole Attacks Security Model (GBHASM) for Wireless Ad-Hoc Networks," Computer and Automation Engineering (ICCAE), 2nd International Conference, Feb. 26-28, 2010, pp. 756-760.

* cited by examiner

DEVICE BLOCKING TOOL

CROSS-REFERENCE TO RELATED APPLICATIONS

The present application is a continuation of U.S. Non-Provisional patent application Ser. No. 14/809,818 filed Jul. 27, 2015 by Rahul Isola, et al., and entitled "DEVICE BLOCKING TOOL," which is incorporated herein by reference as if reproduced in its entirety.

TECHNICAL FIELD

The present disclosure relates to locating undesirable devices on a network, and more particularly to the automated locating and disconnection of undesirable devices on a communication network.

BACKGROUND

Many enterprises have expansive networks that include a large number of connected devices. Some networks may include a variety of network components from different vendors and with varying capabilities. Enterprises with large networks often monitor their networks for security concerns, malicious attacks or other undesirable activity. To provide real-time mitigation of undesirable activity, an enterprise may wish to have the capability to manage communications between a given device and the enterprise network.

SUMMARY OF THE DISCLOSURE

In accordance with the present disclosure, a system for automated locating and disconnection of undesired devices is provided which substantially eliminates or reduces disadvantages and problems associated with previous systems and methods.

According to a particular embodiment, automated locating and disconnection of undesired devices may include receiving the media access control (MAC) address of a candidate device, determining the IP address of the switch coupled to the candidate device based on the MAC address of the candidate device, accessing the switch using the switch IP address, receiving switch information from the switch, receiving credentials from the user and commands to transform the candidate device into a disconnected state, determining whether the user is permitted to execute the commands based on the credentials from the user. If the user is permitted to execute the commands, embodiments of the present disclosure may transform the candidate device into a disconnected state on the network and add the MAC address to a blacklist. A device may be deemed to be undesired on the network due to intrusion events, violation of network policies, or other appropriate criteria.

Particular embodiments provide various technical advantages. The present disclosure provides a flexible framework that permits the automated location and disconnection of undesired devices from a network. For example, an appropriate device blocking system may determine the switch coupled to the undesired device and execute appropriate commands to disconnect the device on the network. Although commands and algorithms to disconnect the undesired device from the network may vary depending on the specific nature and capabilities of the switch coupled to the device, the systems and methods according to the present disclosure are capable of determining suitable commands, using appropriate criteria, to disconnect or mitigate the risk associated with an undesired device on the network.

Embodiments according to the present disclosure may facilitate disconnecting devices in a heterogeneous network that may employ disparate network components, such as switches manufactured by different vendors or employing different operating systems. In certain embodiments, additional techniques may be employed to determine optimal network locations to reroute traffic associated with an undesired device. Other embodiments may test capabilities associated with a particular switch before issuing a command to disconnect a device coupled to the switch, preferably without interrupting other devices connected to the switch.

Enterprise networks and other large networks like the Internet are relied on by users for an ever-increasing set of essential activities. In general, networks are designed to provide access to a wide set of users to facilitate communication between each other and other networks and servers. However, this open nature of a computer network as an accessible communication resource also makes it a target for malicious activity by undesired endpoints. The ease of accessing a computer network also makes it challenging to identify and locate undesired endpoints given that the network is designed to be accessible from any one of many network components (e.g. switches). Techniques of the present disclosure solve that specific problem by identifying and locating those undesired endpoints based on the network component through which they have gained access to the network and determining the most effective way to disable their operation on the network.

Thus, an administrative framework is disclosed that that may be configured, built and deployed in a network environment to enable automated location and disconnection of undesired devices from a network.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
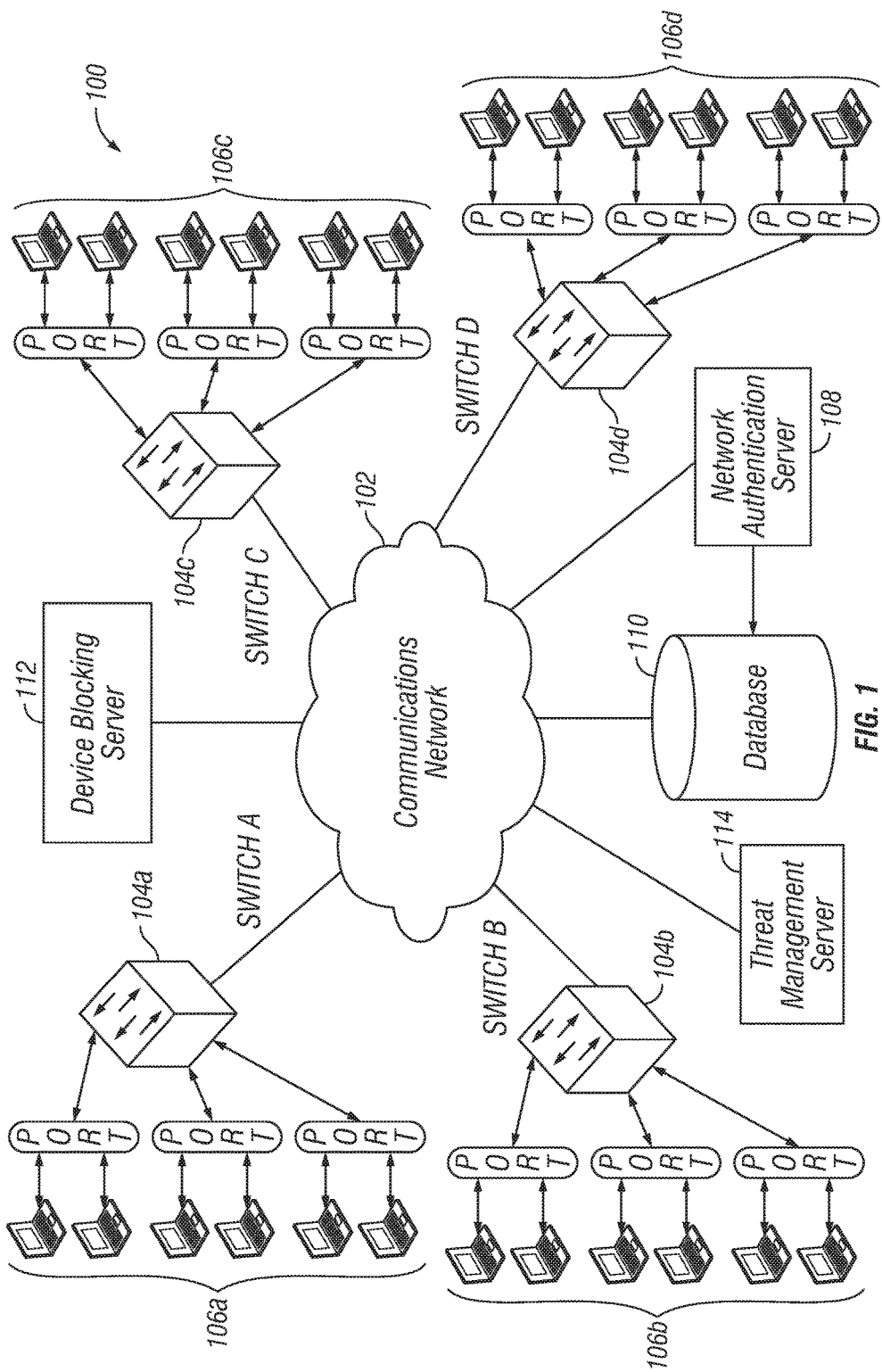
FIG. 1 is a block diagram illustrating a system environment with elements that interoperate to facilitate automated locating and disconnection of undesirable devices.
Figure 2:
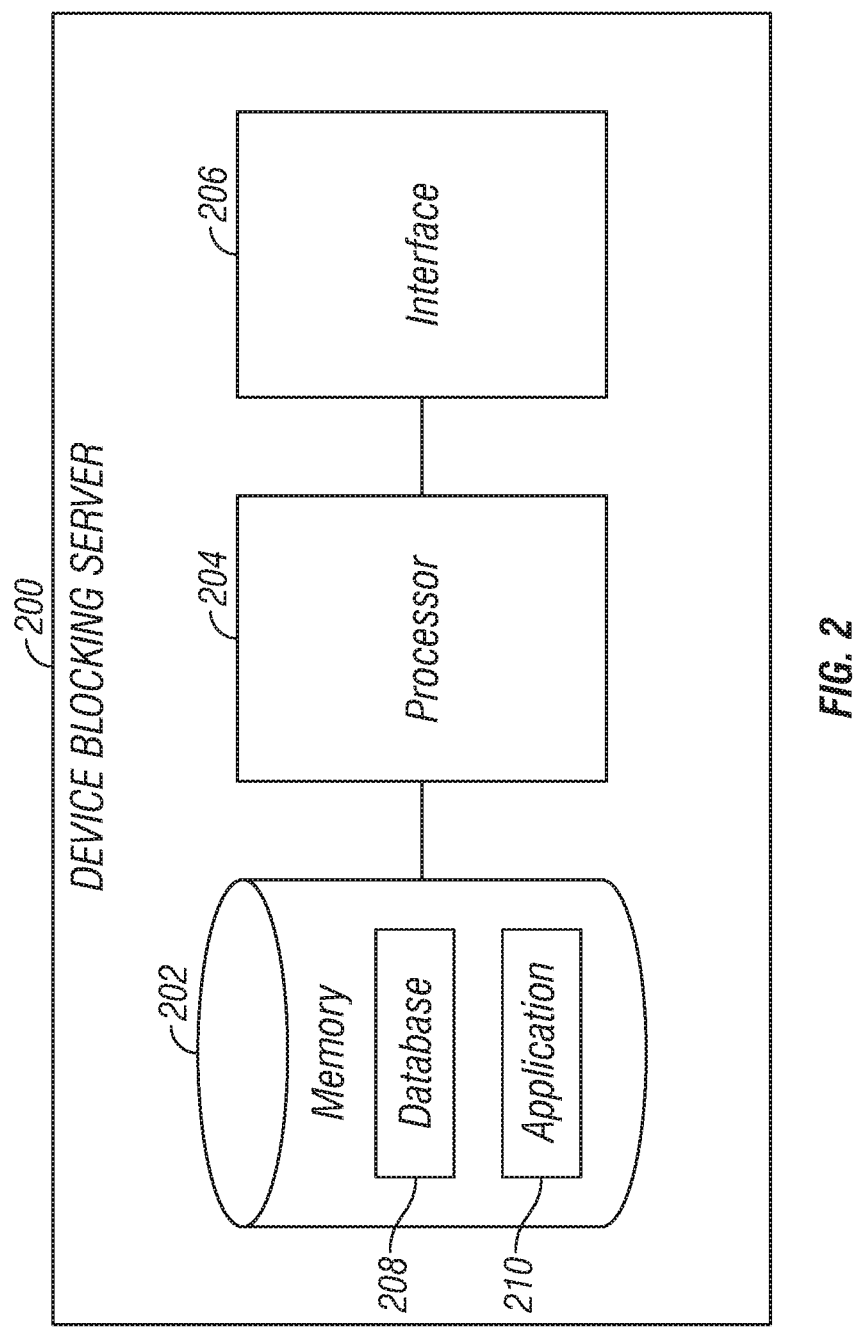
FIG. 2 is a block diagram illustrating an example device blocking server for performing various aspects of automated locating and disconnection of undesirable devices.
Figure 3:
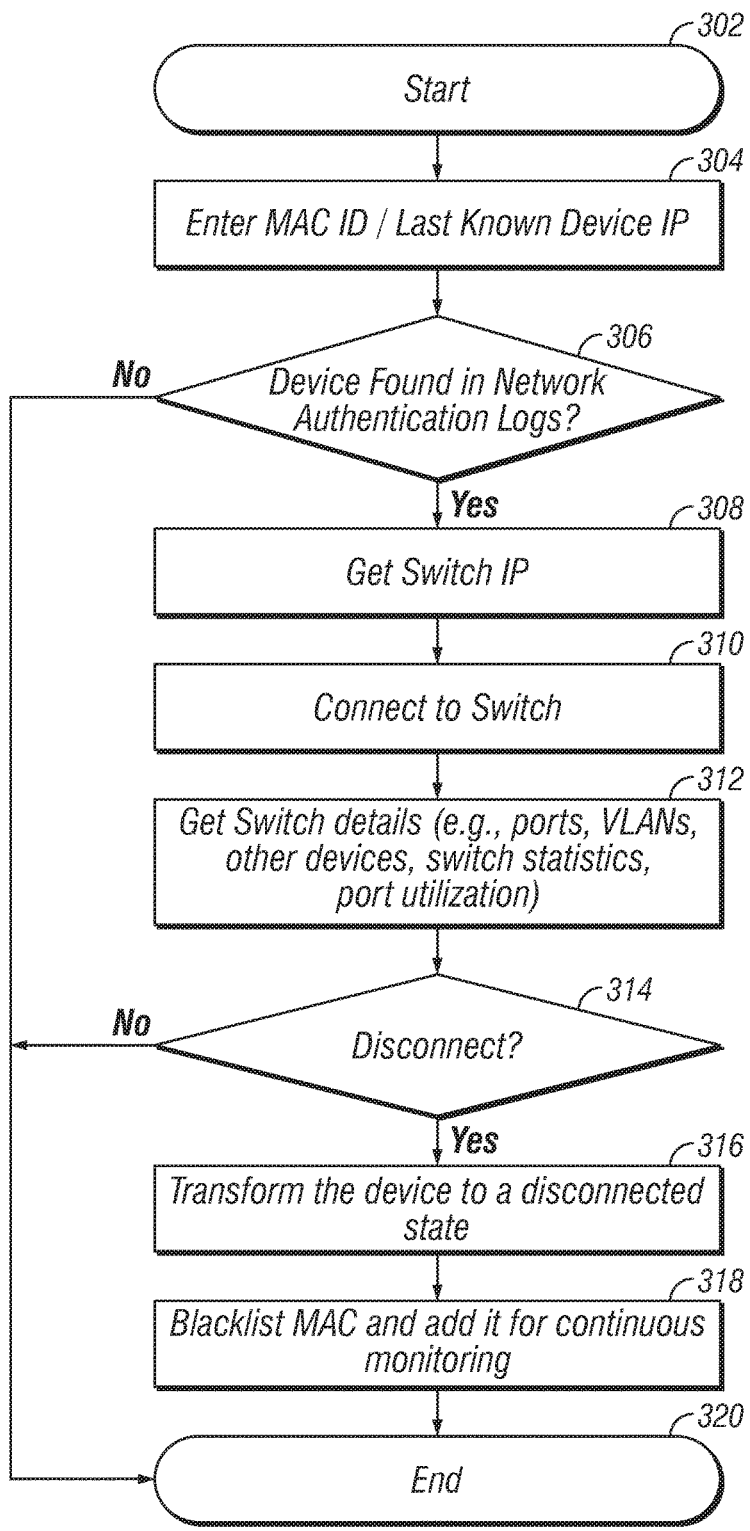
FIG. 3 illustrates an example process flow for automated locating and disconnection of undesirable devices.

Embodiments of the present disclosure and its advantages are best understood by referring to FIGS. 1-3, like numerals being used for like and corresponding parts of the various drawings.

FIG. 1 is a block diagram illustrating a system 100 with elements that interoperate to facilitate automated locating and disconnection of undesirable devices. The elements of system 100 can support a number of different operations, including determining the location of undesirable devices, such as malicious devices, gathering and assessing details of a switch associated with undesirable devices, authenticating a user, determining disconnection capabilities of the switches coupled to the undesirable devices, facilitating disconnection of undesirable devices, and actively monitoring the network for subsequent connections from the undesirable devices. In some embodiments, some of these tasks may be performed by servers, such as a device blocking server. In other implementations, these tasks may be performed in a distributed fashion using various components that interface with each other over a network. Embodiments of the present disclosure facilitate removing or disconnecting undesirable devices (e.g., non-compliant, rogue, or malicious devices) that may be connected to a common network through a variety of network components having disparate capabilities and features. For example, embodiments of the present disclosure may be deployed in an enterprise environment to allow administrators to automatically locate and disconnect undesirable devices from the enterprise network.

In the illustrated embodiment, system 100 includes a number of elements interconnected by one or more networks, represented by communications network 102. Communications network 102 represents communications equipment, including hardware and any appropriate controlling logic, for interconnecting elements and facilitating communication between these elements. Communications network 102 may include local area networks (LANs), metropolitan area networks (MANs), wide area networks (WANs), any other public or private network, local, regional, or global communication network such as the Internet, enterprise intranet, other suitable wired or wireless communication link, or any combination thereof. Communications network 102 may include any combination of gateways, routers, hubs, switches, access points, base stations, and any other hardware, software, or a combination of the preceding that may implement any suitable protocol. Communications network 102 may include other types of networks, including wireless or wired networks. The use of communications network 102 facilitates seamless location and disabling of undesired devices regardless of the geographic location or communication protocols employed by network components or devices on the network. While only one communications network 102 has been illustrated, it should be understood that various embodiments may operate using multiple communications networks 106. In addition, various embodiments may employ one or more wired and wireless networks in communications networks 106.

Communications network 102 interconnect other elements of system 100, including switches 104, endpoint devices 106, network authentication server (NAS) 108, database 110, device blocking server 112, and threat management server 114. It should be understood that while system 100 is illustrated as including a single communications network connected to specific components, various embodiments may operate using any suitable arrangement and collection of networks and components that enable appropriate communications.

As illustrated, system 100 includes switches 104a, 104b, 104c, and 104d coupled to communications network 102. Switches 104 represent communications equipment, including hardware and any appropriate controlling logic, for interconnecting elements and facilitating communications to and from endpoint devices. Switches 104 may include gateways, call managers, routers, hubs, switches, access points, base stations, cellular towers, radio networks, satellite telephone equipment implementing appropriate protocols for wireless telephony communications. While only a select number of switches 104 have been illustrated, it should be understood that various embodiments may operate using any number of switches. In addition, various embodiments may incorporate switches 104 in other wired or wireless networks coupled to the communications network 102 of system 100.

The illustrated embodiment of system 100 also includes endpoint devices 106a, 106b, 104c, and 104d coupled to communications network 102 through switches 104. Endpoint devices 106 represent any suitable hardware, including appropriate controlling logic and data, capable of connecting to and communicating over a network. For example, endpoint devices 106 may include wired or wireless devices, including but not necessarily limited to, workstations, laptops or notebook computer systems, printers, Voice over Internet Protocol (VoIP) telephones, IP phones, mobile telephones, advanced phones (e.g., smartphones), personal digital assistants (PDAs), wireless handsets, notebook computer systems, tablet computer systems, embedded devices, network sniffers, auxiliary devices, or the like. In particular embodiments, endpoint devices 106 are capable of transmitting and receiving all forms of media including audio, video, images, text messages, and other data formats, and documents and accessing disparate network-based services.

In the illustrated embodiment, system 100 also includes an network authentication server (NAS) 108. NAS 108 represents any appropriate combination of hardware, controlling logic, and data that facilitates user authentication, admission control and logging, policy enforcement, auditing, and security associated with communications network 102. In particular embodiments, NAS 108 may represent a networked server or collection of networked servers. NAS 108 may be directly or indirectly coupled to other systems such as database 110 to store and retrieve information related to network access control and authentication. Embodiments of the present disclosure may use NAS 108 to track attempted and actual connections by endpoint devices 106 to communications network 102 using switches 104. For example, NAS 108 may monitor and track the MAC address and/or IP address associated with endpoint devices 106 on communications network 102 and the IP address and/or port of the switch coupled to those endpoint devices. In certain implementations, NAS 108 may log appropriate information about each network access by endpoint devices 106 by communicating with database 110. In particular embodiments, the functionality of NAS 108 may be provided by a third party data server such as a Cisco™ Secure Access Control System. In particular embodiments, the activity recorded at the NAS may be accessed by a log server, such as a Cloudera™ big data server, and utilized as an intermediate data repository.

As illustrated, system 100 includes a database 110. Database 110 includes suitable hardware and software, including memory and control logic, for storing, accessing, retrieving, and communicating various types of information, including for example, network activity data. Database 110 may include any suitable combination of volatile or non-volatile, local or remote devices suitable for storing and maintaining information. For example, database 110 may include random access memory (RAM), read only memory (ROM), solid state storage devices, magnetic storage devices, optical storage devices, or any other suitable information storage device or a combination of such devices. In particular embodiments, database 110 represents a relational database for storing connection logs and network activity logs of endpoints 106 in a retrievable manner. Database 110 may represent a database service provided by a third-party. In particular embodiments, database 110 may represent a database for storing all connection details related to endpoints 106. For example, database 110 may maintain network activity information such as IP addresses/MAC addresses associated with endpoints 106 and Internet Protocol (IP) addresses of switches 104 coupled to particular endpoints 106. In certain embodiments, database 110 may also include port information for switches 104 or endpoints 106. Database 110 may be directly or indirectly coupled to other systems such as NAS 108 and be capable of storing and retrieving information related to network access based on instructions from NAS 108. In particular embodiments, the storage and functionality of database 110 may be provided by a third party data server such as a Cloudera Big Data server. In some embodiments, database 110 may reside on an network authentication server, such as NAS 108.

Device blocking server 112 represents any appropriate combination of hardware, controlling logic, and data for facilitating automated locating and disconnection of undesirable devices. For example, device blocking server 112 may represent a networked server or collection of networked servers capable of communicating with other elements of system 100 to locate one or more undesired devices and disconnect them from the network. In particular embodiments, device blocking server 112 may be accessed by an administrator, for example through a trusted device, to perform the operations of the present disclosure. As illustrated, device blocking server 112 couples to communications network 102 to facilitate communication with other elements of system 100. For example, device blocking server 112 may communicate with and retrieve relevant information from database 110 and switches 104 to locate undesired devices and disable their connectivity on communications network 102 by accessing and executing instructions on the appropriate switches 104.

Threat management server 114 represents any appropriate combination of hardware, controlling logic, and data for facilitating active monitoring of endpoint devices 106. For example, Threat management server 114 may represent a networked server or collection of networked servers capable of communicating with other elements of system 100 to monitor and prevent access to the network based on appropriate control logic. In particular embodiments, threat management server 114 may comprise suitable memory to store lists of trusted and untrusted devices. For example, threat management server 114 may maintain whitelists that identify endpoint devices 106 which are known to be trustworthy. In addition, threat management server 114 may maintain blacklists that identify endpoint devices 106 which are known to be untrustworthy. In particular embodiments, the blacklists maintained by threat management server 114 may include endpoints that have previously been disconnected from communications network 102 by device blocking server 112. As illustrated, threat management server 114 couples to communications network 102 to facilitate communication with other elements of system 100. For example, threat management server 114 may receive instructions from device blocking server 112 and/or retrieve relevant information from database 110 and switches 104 to prevent subsequent network access by undesired endpoint devices. In particular embodiments, the functionality of threat management server 114 may be provided by a third party data server, such as an ArcSight™ server. In some embodiments, threat management server 114 may reside on another data server or its functionality may be provided by another data server, such as NAS 108 or device blocking server 112.

Particular embodiments are designed to operate in a network environment that facilitates the automated locating and disconnection of undesired devices. In particular embodiments, this process may include receiving a unique address of a candidate undesired endpoint device (e.g., MAC or IP address), determining the IP address or other unique address of the switch coupled to that endpoint device by transforming the unique address of the undesired device into a switch address, and performing appropriate commands on that switch to effectively disconnect the undesired endpoint device from the communications network based on the capabilities of the appropriate switch. For example, an endpoint device may be deemed to be undesired on the network due to intrusion events, violation of network policies, or other appropriate criteria. To disconnect the endpoint device from the network, the system may execute appropriate logic and connect to other systems to transform the MAC/IP address of the endpoint device into an IP address of the switch coupled to the endpoint device from which suitable commands to disconnect the endpoint device can be executed. Using the IP address of the switch coupled to the network device, the system may obtain additional details from the switch and determine an effective way to disconnect the undesired device from the network. In certain embodiments, the system may blackhole or reroute traffic associated with the undesired device or transform the specific switch port coupled to the endpoint device from an active (e.g., ON) state to an inactive (e.g., OFF) state. In some embodiments, rerouting traffic associated with the undesired device involves transforming the intended destination network location of such traffic to a safe reroute destination (e.g., safe zone). In particular embodiments, the unique address of the disconnected device will be added to an appropriate blacklist to prevent subsequent access to the communications network. Systems, methods, and software described by example in the present disclosure may increase the efficiency, speed, and effectiveness of disconnecting devices from a network once an endpoint device is determined to be a rogue, malicious, or untrustworthy endpoint device.

In operation, elements of system 100 operate together to perform various network administration functions including but not limited to maintaining a central, unified repository of network activity on the network, facilitating identification and disconnection of undesired endpoint devices and their corresponding network components (e.g., switches), and preventing subsequent access to the network by undesired endpoint devices. For example, in particular embodiments, elements of system 100 may allow a network administrator to effectively disconnect an endpoint device with a particular MAC address from the network.

In particular embodiments, one or more endpoint devices 106 connect or seek access to communications network 102. For example, one of endpoint devices 106a may attempt to access communications network 102 through switch 104a. In doing so, network authentication server 108 may grant access based on predetermined policies and track the MAC and/or IP address of that endpoint device along with details associated with switch 104a, such as the switch IP address and port information. In some embodiments, network authentication server 108 communicates with and stores such network activity information in database 110. In operation, it may be later determined that the same endpoint device is an undesired device on the network because it performing some malicious or undesired activity on the network. For example, a device may be determined to be undesired by the automated enforcement of network policies, detection of intrusion events, or other appropriate criteria, or alternatively by receiving direct input from a system administrator. Using an appropriate user interface, the device blocking server 112 may be accessed to initiate location and disconnection of that endpoint device. In some embodiments, the user interface may be an interface accessible through a web browser or an application on an endpoint device. In certain implementations, device blocking server 112 may access database 110 to determine the IP address of the switch coupled to the endpoint device using its MAC address. Using the IP address of the switch, device blocking server 112 may access the appropriate switch (e.g., switch 104a), obtain relevant information about the switch including port details and available features of the switch, and issue an appropriate command, based on this information, to effectively disconnect the relevant endpoint device 106a, either logically or physically, on communications network 102. For example, as discussed in further detail below, the relevant endpoint device 106a may be disconnected from the network by blackholing or rerouting traffic associated with endpoint 106a. In other embodiments, endpoint device 106a may be disconnected by transforming the state of the specific switch port associated with the relevant endpoint device 106a from an active (e.g., ON) state to an inactive (e.g., OFF) state. In certain embodiments, the unique address of the undesired endpoint device 106a may be added to a blacklist on threat management server 114 to prevent subsequent access to communications network 102.

In certain implementations, an endpoint device 106a may be logically disconnected from communications network 102. In some embodiments, logically disabling endpoint device 106a may involve blackholing the device. Blackholing refers to using a suitable switch capability to discard or drop frames associated with communications to or from a particular device. In other embodiments, logically disabling endpoint device 106a may involve rerouting traffic associated with the relevant endpoint device 106a to a safe zone. A safe zone refers to a network location that is deemed to be safe to receive traffic from an untrusted device. For example, a safe zone may represent an empty port or a port on a switch that is connected to devices with acceptable levels of risk, such as a VoIP phone, a printer, or a display. In particular implementations, the impact of malicious activity by a rogue endpoint may be mitigated by rerouting traffic associated with that endpoint to a safe zone. In some implementations, a safe zone may also be a network traffic monitoring server that may enable live monitoring, recording, and/or forensic analysis of any undesirable communication associated with the undesired or rogue endpoint.

In some implementations, an endpoint device 106a may be physically disconnected from communications network 102 by shutting off electrical power to the port of switch 104a coupled to the endpoint device 106a. In certain embodiments, this involves transforming the port from an active (e.g., ON) state to an inactive (e.g., OFF) state. Depending on the network architecture and the nature of other endpoint devices connected to the same port of switch 104a, physically disabling the port may be a viable option to disable the particular endpoint device 106a from accessing communications network 102. In other implementations, this physically disabling the switch port may only be employed as a last resort due to potential collateral impact to other devices using the same port to connect to communications network 102.

Components of system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of system 100 and the components within system 100.

While system 100 is illustrated as including specific components arranged in a particular configuration, it should be understood that various embodiments may operate using any suitable arrangement and collection of components capable of providing functionality such as that described.

FIG. 2 illustrates a system 200 as a particular embodiment of an device blocking server 112 that automatically locates and disconnects undesired endpoints from a network according to particular control logic. In a particular embodiment, system 200 represents a proprietary device blocking server that facilitates the automated locating and disconnection of undesired endpoints in a particular enterprise network.

As illustrated, system 200 may include various interconnected elements including a memory 202, a processor 204, and an interface 206. Memory 202 stores, either permanently or temporarily, data, operational software, or other information for processor 204.

Memory 202 represents any suitable combination of volatile or non-volatile, local or remote devices suitable for storing information. For example, memory 202 may include RAM, ROM, solid state storage devices, magnetic storage devices, optical storage devices, or any other suitable information storage device or a combination of such devices. As illustrated, memory 202 includes a database 208, and application 210 to facilitate automated location and disconnection of undesired devices. Database 208 represents a relational database for storing and organizing various types of network information such as endpoint information (e.g., MAC and IP addresses), switch information, credentials for authentication, and appropriate network policies or rules. In particular embodiments, database 308 may be any suitable database capable of organizing network information.

Application 210 generally refers to logic, rules, algorithms, code, tables and/or other suitable instructions for performing the described functions and operations of system 200. In certain embodiments, application 210 may facilitate the interaction of system 200 with switches 104, NAS 108, database 110, threat management server 114 and/or endpoints 106 using communications network 102.

Processor 204 represents one or more processing elements, including hardware, logic, and data capable of controlling the operation of system 200. For example, processor 204 may be a computer processor for executing an device blocking application stored in memory 202, or any other software or controlling logic associated with system 200, such as an appropriate operating system. According to particular embodiments, processor 204 may be a programmable logic device, a microcontroller, a microprocessor, any other appropriate processing device, or any suitable combination of the preceding.

Interface 206 represents any appropriate combination of hardware and controlling logic for coupling to one or more networks. Interface 206 may support any number of suitable protocols for communicating on a communication network. For example, network interface 206 may be a wired or wireless local area network interface, cellular network interface, satellite interface, and/or any other appropriate interface for communicating on a communication network. Interface 206 may have multiple interfaces for handling different communication protocols.

In operation, processor 204 interacts with interface 206 to receive information regarding undesired devices (e.g., MAC or IP address), such as endpoint devices accessing a communication network. System 200 may receive a request to locate a particular endpoint device identified, for example, by a MAC address or IP address. Processor 204 may execute appropriate control logic as defined by application 210 to determine the network location (e.g., IP address) of the switch coupled to that endpoint device. As appropriate, processor 203 may store endpoint and switch information in database 208. Once the IP address of the switch is determined, processor 204 may execute appropriate logic from application 210 to determine additional details about the switch such as port information, virtual local area network (VLAN) information, switch statistics, such as specific ingress and egress data transfer rates associated with the switch, and port utilization.

Based on the switch information and determined capabilities of the switch, processor 204 may facilitate logically or physically disconnecting the endpoint device. In particular embodiments, processor 204 may execute appropriate logic to authenticate the credentials for the user of the system before performing actions to disconnect the endpoint device. In particular embodiments, processor 204 may employ suitable control logic to determine the capabilities of the switch. For example, it may determine whether the switch can blackhole the endpoint device, reroute traffic associated with the endpoint device to a safe zone, and/or physically shutoff electrical power to a switch or switch port associated with the endpoint device. In addition, in certain embodiments, processor 204 may execute appropriate control logic to determine a suitable safe zone for purposes of rerouting traffic. Thus, system 200 represents an example device blocking server that is operable perform the functions of the present disclosure.

While system 200 is illustrated as including specific components, it should be understood that various embodiments may operate using any suitable arrangement and collection of components.

FIG. 3 is a process flow diagram illustrating process flow 300 for the automated locating and disconnection of undesirable devices on a communication network. The steps of process flow 300 correspond to an example sequence of steps for performing automated locating and disconnection of undesirable devices. A process like process flow 300 may be implemented on an appropriate system, such as a device blocking server.

In the illustration, process flow 300 includes a number of steps for determining the location of an undesired device, and once located, various steps for disconnecting the undesired device from the network. As appropriate, network policies may dictate whether, when, and how an undesired device may be disconnected from the network. For example, certain network policies may require the reentry of user credentials or the entry of new user credentials to disconnect a device from the network. As shown, the process flow starts at step 302, includes a request device identification step 304, a query NAS step 306, a get switch IP address step 308, a connect to switch step 310, a get switch details step 312, a disable decision step 314, a disable MAC or port step 316, a blacklist step 318, and ends at step 320. This collection of steps may be performed, for example, on a server, such as device blocking server 200.

In operation, process flow 300 starts at step 302. At step 304, the server may request a unique identification of a device on the network that is deemed to be undesirable. For example, in request device identification step 302, an administrator may enter the MAC address or last known IP address of the device. In this manner, a device may be identified to the system as a candidate for disconnection from the network. Next, process flow 300 continues to the query NAS step 304. In this step, the system consults a NAS to determine whether the unique identifier (e.g., MAC address or IP address) of the candidate device is located in its network logs. In particular embodiments, a NAS may maintain network logs that include connection information for devices accessing the communication network. In certain embodiments, consulting the NAS may require communicating over a communication network to another server. In some embodiments, the system may search for candidate device within a predetermined recent period of time in the NAS logs. For example, the system may search for candidate device within the last predetermined number of hours in the NAS logs. In other embodiments, the system may search for the candidate device across the entire NAS log. If the unique identifier of the candidate device (e.g., MAC address or IP address) is not found in the NAS log, then process flow 300 ends at step 320. If, however, the unique identifier of the candidate device is found in the NAS log, process flow proceeds to step 308. In some embodiments, step 304 may require the reentry of user credentials or the entry of new user credentials to before the unique identification of candidate device can be provided.

At step 308, the system may parse entries in the NAS logs to determine the IP address or other unique identifier of the switch coupled to the candidate device. In particular implementations, the NAS logs may contain various details about the time the candidate device connected to the network, the MAC address of the candidate device, the IP address of the candidate device, the IP address of the switch it is connected to, the port on the switch it is connected to, network destinations that the candidate device may have tried to access, and any other appropriate connection details. Based on the relevant entry in the NAS logs for the candidate device, the system may parse and determine the IP address or other unique identifier of the switch coupled to the candidate device.

Next, process 300 proceeds to connect to switch step 310. In step 310, the system connects to the switch identified by the unique address in step 308 using a suitable protocol. In particular embodiments, the system employs the Simple Network Management Protocol (SNMP) to connect to the switch using the IP address or other unique identifier of the switch. In other embodiments, a secure shell (SSH) protocol may be employed to connect to the switch. In some embodiments, a user may be required to provide additional credentials before it is granted access to connect to the switch. Accordingly, in some embodiments, a two-stage authentication may be employed where credentials are first required to initiate process flow 300 in steps 302 and 304, and second are required to connect to the switch coupled to the candidate device in step 310. Based on applicable network policies, the credentials provided for the two-stage authentication may be the same or different from each other.

In step 312, process flow 300 issues appropriate commands to obtain various details from the switch to facilitate disconnecting the candidate device. For example, a system may request the switch to provide details regarding the various active and inactive ports and virtual local area networks (VLANs). In certain embodiments, the switch may be requested to provide switch statistics and port utilization information. In some embodiments, the switch may be requested to provide details regarding the nature of other devices connected to the switch. For example, the switch may be able to identify the nature of devices connected to its ports. Accordingly, in appropriate embodiments, the switch may identify whether particular ports are coupled to a VoIP phone, IP phone, printer, or display, or alternatively connected to a computing device, such as a notebook or desktop computer, smartphone, or tablet computer. In particular embodiments, the switch may be requested to provide details regarding the ingress and egress data transfers, including data transfer rate, occurring at the switch level or more specifically on each port.

The switch details obtained in step 312 provide the criteria to assist a system, such as device blocking server 200, in its determination of whether and how to disconnect a candidate device from the communication network. Various algorithms, based on enterprise policy or other considerations, may be employed to decipher the information gathered in step 312 and influence the decision of whether and how to disconnect candidate devices. For example, if there is a substantial amount of inbound ingress traffic and an insubstantial amount of egress traffic, network policies may dictate that the device should be disconnected because such activity may represent the characteristics of a denial of service (DOS) attack. In that situation, the system may determine that it may be preferable to shut down the port entirely due to the level of unfavorable activity, or alternatively logically disconnect the device from the network by blackholing or rerouting traffic associated with the candidate device.

In step 314, process flow 300 determines whether to disconnect the candidate device. In particular embodiments, this decision may be influenced by the information gathered in 312. In other embodiments, the decision of whether to disconnect a candidate device may be decided by a user. In those embodiments, the user may be required to provide appropriate credentials before a user is permitted to issue commands to disconnect a candidate device from the network. In alternative embodiments, the disconnect decision step 314 may be influenced by user decision and one or more switch details gathered in step 312. In certain embodiments, a user may be provided with one or more of the switch details and will make the ultimate decision of whether to disconnect a candidate device. As noted above, various algorithms could be employed, based on enterprise policy or other considerations, to influence the decision of whether and how to disconnect a candidate device. In step 314, if it is determined that the candidate device should not be disconnected, then process flow 300 ends at step 320. If, however, process flow 300 determines that the candidate device should be disconnected, then process flow proceeds to step 316.

Next, in step 316, process flow 300 issues appropriate commands to the switch coupled to the candidate device to disconnect a candidate device from the network. In particular embodiments, commands for disconnecting a candidate device are issued using a secure shell (SSH) protocol. For example, disconnecting a candidate device may involve logically or physically transforming the device on the network into a disconnected state. For instance, disconnecting the candidate device may involve logically or physically transforming the traffic or the port associated with the device on the network. In some embodiments, logically disconnecting the device is preferable to physically disconnecting the device on the network. Logically disconnecting the candidate device may involve blackholing the candidate device and/or rerouting traffic associated with the candidate device to a safe zone. In certain implementations, blackholing traffic associated the candidate device is preferable to rerouting traffic associated with the device to a safe zone. In the case of blackholing, a suitable switch capability may be employed to discard or drop frames associated with communications to or from the candidate device. For example, a switch may transform the destination of traffic associated with a particular MAC address or IP address corresponding to the candidate device to a null destination. As a result, even though the device may be physically connected to a switch, it may not be able to communicate effectively using the switch. In particular embodiments, physically disconnecting the candidate device may involve shutting off electrical power to the specific port on the switch coupled to the candidate device. In certain embodiments, physically disconnecting the device may involve transforming the state of the specific port from an active (e.g. ON) state to an inactive (e.g., OFF) state. In appropriate embodiments, process flow 300 issues a lock command to disallow other interfering activity on the switch before issuing the command to disconnect the candidate device from the network. In those embodiments, process flow 300 issues an unlock command to release the lock or otherwise unlock the switch after the command to disconnect the device from the network has been executed to completion. For example, a lock command may be issued before issuing a blackhole command or a reroute command and an unlock command may be issued after the blackhole command or reroute command has been executed to completion.

In embodiments where traffic associated with a candidate device may be rerouted to a safe zone, the system may determine a network location deemed to be safe to receive traffic from an undesired device and reroute traffic associated with the candidate device to that location. For example, the system may reroute traffic associated with the candidate device to an empty port or a port coupled to other acceptable risk devices. For example, a switch may transform the destination of traffic associated with a particular MAC address or IP address corresponding to the candidate device to the network address of the determined safe zone. For instance, the system may reroute traffic associated with the candidate device to a port coupled to a VoIP phone, IP phone, printer, display or another device with any other suitable device with an acceptable level of risk. In this manner, undesired activity by a rogue or malicious device may be isolated and thereby mitigated. In some embodiments, the system will reroute traffic based on inclusion and/or exclusion lists.

Inclusion lists may specify network locations, such as particular switch ports, that are favorable network destinations for rerouting. For example, the inclusion list may include ports coupled to a VoIP phone, IP phone, printer, or a display. The inclusion list may also contain ports that have previously been a reroute destination for unfavorable devices by a system, such as device blocking system 112. For example, the system may add a reroute destination (e.g., a particular switch port) to the inclusion list after step 316 has been completed so that it can be reused as necessary for rerouting when a user later determines that other undesired devices should be disconnected or disabled from the network.

Exclusion lists may specify network locations, such as particular switch ports, that are unfavorable destinations for rerouting. For example, an exclusion list may include trusted endpoint devices that are desired on the network, or endpoint devices with access to sensitive or confidential information. In certain embodiments, the system will determine whether a candidate reroute port is present on the inclusion list and absent from the exclusion list. An exclusion list may be populated by a system administrator or alternatively automatically populated when certain types of acceptable risk devices access the network from a particular switch port. In other embodiments, a reroute port may be determined based on the candidate reroute port satisfying distance criteria, such as a maximum or minimum distance from the port associated with the undesired device.

In embodiments where the candidate device may be physically disconnected by shutting off electrical power to the specific port on the switch coupled to the candidate device, process flow 300 may determine, based on network architecture and the other devices coupled to the switch, whether physically disconnecting the port is a viable method of disabling the candidate device. In some implementations, this option of physically disconnecting the switch port may only be used as a last resort due to potential collateral impact to other devices using the same port to connect to the communications network. As discussed above, in certain embodiments, physically disconnecting the device may involve transforming the state of the specific port from an active (e.g., ON) state to an inactive (e.g., OFF) state. In some embodiments, commands may be issued to the switch to logically disable the port coupled to the candidate device without shutting off electrical power to the port.

Certain embodiments of the present disclosure may employ appropriate techniques to determine the capabilities and commands available on the switch coupled to the candidate device in order to issue the appropriate command to disconnect the device. As a result, step 316 may include algorithms designed to assess available commands and capabilities of the switch coupled to the candidate device. For example, step 316 may involve transmitting appropriate test commands to the switch coupled to the candidate device and receiving a response to the test command to determine whether the switch device can accept the command. In some embodiments, issuing the test command involves issuing the actual command without the appropriate parameters for the command. In certain embodiments, the response to the test command specifies required and optional parameters associated with issuing the actual command. Accordingly, in appropriate embodiments a blackhole test command, a reroute test command, and/or a disable port test command may be issued to assess whether the switch coupled to the candidate device supports blackholing, rerouting, and/or disabling a port, respectively.

A network may include switches from multiple manufacturers with different capabilities and available commands. In some networks, even if some of the switches are manufactured by the same entity, they may still employ different versions of the relevant operating system with different capabilities and available commands. As a result, any two switches on the same network may not support identical commands associated with disabling a candidate device from the network. For example, certain switches in a network may not permit blackholing but may permit rerouting, and vice versa. Likewise, some switches in a network may only support shutting electrical power to a port and may not support blackholing or rerouting. As a result, embodiments of the present disclosure may be employed in networks with disparate switches supporting a variety of commands related to disabling a candidate device from the network through the use of appropriate test commands.

Next, in step 318, the unique address of the candidate device (e.g., MAC address or last known IP address) may be added to a blacklist. The blacklist may reside on a server, such as device blocking server 112, or alternatively be communicated to an appropriate threat management server or database, such as threat management server 114 or database 110. By listing the unique identifier of the undesired device in such a blacklist, threat management systems or network administrators may employ appropriate techniques to monitor the network continuously attempts to access the network again from the same device and block it as necessary. In some embodiments, if the candidate device attempts to access the network again, a user of the system (e.g., network administrator) may be notified of the unauthorized access with details regarding the attempted access. If disabling the device in step 315 involved rerouting traffic associated with the candidate device, the reroute network location may be added to an appropriate inclusion list of device blocking server 112.

While flow chart 300 is illustrated as including specific steps arranged in a particular sequence, it should be understood that various embodiments may operate using any suitable arrangement and collection of steps capable of providing functionality such as that described. Accordingly, modifications, additions, or omissions may be made to flow chart 300 as appropriate.

Although the present disclosure describes several embodiments, it should be understood that a myriad of changes, substitutions, and alterations can be made without departing from the spirit and scope of the invention as defined by the appended claims.

What is claimed is:

1. An apparatus, comprising:
a user interface configured to receive a media access control (MAC) address of a candidate device coupled to a network and one or more credentials from a user;
a memory configured to store the MAC address, the credentials from a user, and switch information, wherein the switch information comprises an Internet Protocol (IP) address of a switch coupled to candidate device and one or more ports of the switch;
a network interface configured to communicate with the network;
a processor communicatively coupled to the user interface, the memory, and the network interface, the processor configured to:
 receive the MAC address of the candidate device;
 determine, based on the MAC address of the candidate device, the IP address of the switch coupled to the candidate device, wherein determining the IP address of the switch comprises querying an network authentication database to determine the IP address of the switch through which the candidate device associated with the MAC address connected to the network within a predetermined recent period of time;
 access the switch using the switch IP address;
 receive the switch information from the switch;
 receive, using the user interface, credentials from the user and commands to disconnect the candidate device from the network;
 determine, based on the credentials from the user, whether the user is permitted to execute the commands;

disconnect the candidate device from the network in response to determining the user is permitted to execute the commands, wherein disconnecting the candidate device from the network comprises:
  querying whether the switch can reroute traffic associated with the candidate device to a safe zone; and
  issuing one or more commands to reroute traffic to the safe zone in response to receiving a command to reroute traffic associated with the candidate device to the safe zone; and
add the MAC address of the candidate device to a blacklist following the disconnection of the candidate device from the network.

2. The apparatus of claim 1, wherein disconnecting the candidate device from the network comprises:
querying whether the switch can blackhole the candidate device; and
issuing one or more commands to blackhole the candidate device using the MAC address in response to receiving a command to blackhole the candidate device.

3. The apparatus of claim 1, wherein disconnecting the candidate device from the network comprises:
querying whether the switch can remove electrical power to the port connected to the candidate device; and
issuing one or more commands to remove electrical power to the port connected to the candidate device using the MAC address in response to receiving a command to remove electrical power to the port connected to the candidate device.

4. The apparatus of claim 1, wherein disconnecting the candidate device from the network comprises:
querying whether the switch can transform the port connected to the candidate device to an inactive state; and
issuing one or more commands to transform the port from an active state to the inactive state in response to receiving a command to transform the port to the inactive state.

5. The apparatus of claim 1, wherein the processor is further configured to:
receive the one or more credentials from the user; and
determine whether the user is authenticated before receiving the MAC address of the candidate device.

6. The apparatus of claim 1, wherein the processor is further configured to:
determine that one or more MAC addresses on the blacklist are attempting to access the network; and
communicate a notification of unauthorized access by the one or more MAC addresses to the user.

7. The apparatus of claim 1, wherein the safe zone is an empty port on the switch.

8. A method, comprising:
receiving a media access control (MAC) address of a candidate device coupled to a network;
determining, based on the MAC address of the candidate device, an Internet Protocol (IP) address of a switch coupled to the candidate device, wherein determining the IP address of the switch comprises querying an network authentication database to determine the IP address of the switch through which the candidate device associated with the MAC address connected to the network within a predetermined recent period of time;
accessing the switch using the switch IP address;
receiving, from the switch, switch information associated with the switch;
receiving, using the user interface, credentials from the user and commands to disconnect the candidate device from the network;
determining, based on the credentials from the user, whether the user is permitted to execute the commands; and
disconnecting the candidate device from the network in response to determining the user is permitted to execute the commands, wherein disconnecting the candidate device from the network comprises:
  querying whether the switch can reroute traffic associated with the candidate device to a safe zone; and
  issuing one or more commands to reroute traffic to the safe zone in response to receiving a command to reroute traffic associated with the candidate device to the safe zone; and
adding the MAC address of the candidate device to a blacklist following the disconnection of the candidate device from the network.

9. The method of claim 8, wherein disconnecting the candidate device from the network comprises:
querying whether the switch can blackhole the candidate device; and
issuing one or more commands to blackhole the candidate device using the MAC address in response to receiving a command to blackhole the candidate device.

10. The method of claim 8, wherein disconnecting the candidate device from the network comprises:
querying whether the switch can remove electrical power to the port connected to the candidate device; and
issuing one or more commands to remove electrical power to the port connected to the candidate device using the MAC address in response to receiving a command to remove electrical power to the port connected to the candidate device.

11. The method of claim 8, wherein disconnecting the candidate device from the network comprises:
querying whether the switch can transform the port connected to the candidate device to an inactive state; and
issuing one or more commands to transform the port from an active state to the inactive state in response to receiving a command to transform the port to the inactive state.

12. The method of claim 8, further comprising:
receiving the one or more credentials from the user; and
determining whether the user is authenticated before receiving the MAC address of the candidate device.

13. The method of claim 8, further comprising:
determining that one or more MAC addresses on the blacklist are attempting to access the network; and
communicating a notification of unauthorized access by the one or more MAC addresses to the user.

14. The method of claim 8, wherein the safe zone is an empty port on the switch.

15. A system, comprising:
a hardware switch configured to provide network connectivity to one or more devices, wherein one of the devices is a candidate device coupled to the switch;
a data server comprising a hardware processor configured to:
  receive a media access control (MAC) address of the candidate device coupled to a network;
  determine, based on the MAC address of the candidate device, an Internet Protocol (IP) address of the switch coupled to the candidate device, wherein determining the IP address of the switch comprises querying an network authentication database to determine the IP address of the switch through which the candidate device associated with the MAC address connected to the network within a predetermined recent period of time;

access the switch using the switch IP address;

receive, from the switch, switch information associated with the switch;

receive, using a user interface, credentials from the user and commands to disconnect the candidate device from the network;

determine, based on the credentials from the user, whether the user is permitted to execute the commands;

disconnect the candidate device from the network in response to determining the user is permitted to execute the commands, wherein disconnecting the candidate device from the network comprises:

querying whether the switch can reroute traffic associated with the candidate device to a safe zone; and issuing one or more commands to reroute traffic to the safe zone in response to receiving a command to reroute traffic associated with the candidate device to the safe zone; and add the MAC address of the candidate device to a blacklist following the disconnection of the candidate device from the network.

16. The system of claim 15, wherein disconnecting the candidate device from the network comprises:

querying whether the switch can blackhole the candidate device; and issuing one or more commands to blackhole the candidate device using the MAC address in response to receiving a command to blackhole the candidate device.

17. The system of claim 15, wherein disconnecting the candidate device from the network comprises:

querying whether the switch can remove electrical power to the port connected to the candidate device; and issuing one or more commands to remove electrical power to the port connected to the candidate device using the MAC address in response to receiving a command to remove electrical power to the port connected to the candidate device.

18. The system of claim 15, wherein disconnecting the candidate device from the network comprises:

querying whether the switch can transform the port connected to the candidate device to an inactive state; and issuing one or more commands to transform the port from an active state to the inactive state in response to receiving a command to transform the port to the inactive state.

19. The system of claim 15, wherein the processor is further configured to:

receive the one or more credentials from the user; and determine whether the user is authenticated before receiving the MAC address of the candidate device.

20. The system of claim 15, wherein the safe zone is an empty port on the switch.

* * * * *